United States Patent

Sommer et al.

[11] Patent Number: 5,328,195
[45] Date of Patent: Jul. 12, 1994

[54] BICYCLE HAVING ARM ASSISTED DRIVE

[75] Inventors: Graham Sommer, 104 Peter Coutts Ct., Stanford, Calif. 94305; Jason Quintana, Los Gatos, Calif.

[73] Assignee: Graham Sommer, Stanford, Calif.

[21] Appl. No.: 91,097

[22] Filed: Jul. 13, 1993

[51] Int. Cl.$^5$ ............................................. B62M 1/12
[52] U.S. Cl. .................................. 280/233; 280/244; 280/246; 280/234
[58] Field of Search ................. 280/233, 234, 242.1, 280/244, 246

[56] References Cited

U.S. PATENT DOCUMENTS

| | | | |
|---|---|---|---|
| 1,032,455 | 7/1912 | Waskom | 280/246 |
| 2,232,120 | 2/1941 | Letsch | 280/234 |
| 2,416,092 | 2/1947 | Genin | 280/234 |
| 3,193,305 | 7/1965 | Hendricks | 280/225 |
| 3,485,508 | 12/1969 | Hudnall | 280/234 |
| 3,779,099 | 12/1973 | Trammell, Jr. | 74/594.3 |
| 3,823,959 | 7/1974 | Winters | 280/234 |
| 3,906,807 | 9/1975 | Trammell, Jr. | 74/143 |
| 3,910,599 | 10/1975 | Thomas | 280/234 |
| 4,270,766 | 6/1981 | Thomas | 280/234 |
| 4,303,255 | 12/1981 | Thomas | 280/234 |
| 4,564,206 | 1/1986 | Lenhardt | 280/252 |
| 4,685,692 | 8/1987 | Fullilove et al. | 280/234 |
| 4,705,269 | 11/1987 | DeBoer et al. | 272/73 |
| 4,726,600 | 2/1988 | Wu | 280/234 |
| 4,733,880 | 3/1988 | Wilhelm, III | 280/234 |
| 4,773,662 | 9/1988 | Phillips | 280/233 X |
| 4,900,045 | 2/1990 | Myers, Sr. | 280/233 |

FOREIGN PATENT DOCUMENTS

| | | | |
|---|---|---|---|
| 3126075 | 10/1982 | Fed. Rep. of Germany | 280/233 |
| 3239548 | 4/1984 | Fed. Rep. of Germany | 280/234 |
| 211589 | 9/1940 | Switzerland | 280/233 |

*Primary Examiner*—Margaret A. Focarino
*Assistant Examiner*—Carla Mattix
*Attorney, Agent, or Firm*—Townsend and Townsend Khourie and Crew

[57] ABSTRACT

A dual drive bicycle includes an arm powered drive assembly including a drive mechanism mountable on one of the bicycle wheels or on the foot powered crank mechanism. The drive assembly includes a sprocket and a ratchet assembly for pivotal engagement with the sprocket wheel, a drive line coupled to the ratchet assembly for driving the ratchet assembly and the drive sprocket, and a free wheeling mechanism for coupling the ratchet assembly and the drive sprocket wheel. Movement of the handlebar moves the drive line which engages the ratchet assembly for driving the drive mechanism.

9 Claims, 8 Drawing Sheets

BICYCLE HAVING ARM ASSISTED DRIVE

BACKGROUND OF THE INVENTION

This invention relates generally to bicycles, and more particularly the invention relates to a bicycle having arm assisted drive.

A number of designs have been proposed for arm assisted drive of the conventional foot pedal powered bicycle. Many patents have issued which describe hand cranks used to provide power to the front wheel via a continuous chain drive. Problems attendant with all of these arrangements include difficulty in steering and the added weight of the crank mechanism.

Other patents describe arm assisted drives not requiring a continuous chain. U.S. Pat. No. 4,733,880 describes the use of hand pedals which are mechanically coupled to the foot pedal by tension lines through pulleys. An unconventional dual handlebar is required which complicates steering. Further, the reciprocating movement of the handlebars is continuous when the foot pedals are in use.

U.S. Pat. No. 4,685,692 uses rotary hand cranks in addition to a conventional handlebar for steering. The hand cranks rotate a flexible shaft which is coupled to the shaft of a foot powered sprocket wheel to thereby provide a supplemental drive to the sprocket wheel. Again, there is no on-demand use of the hand crank since the crank is always turning when the foot pedals are turning.

U.S. Pat. No. 4,726,600 discloses a linkage mechanism whereby vertically reciprocating movement of the handlebars is coupled to the foot pedals. Again, the handlebars are always moving when the foot pedals are rotating.

The present invention provides an arm assisted bicycle drive which overcomes disadvantages of the prior art.

SUMMARY OF THE INVENTION

In accordance with the invention, an arm assisted drive is provided in which the drive mechanism is operable on demand with no movement of the mechanism when the arm assisted drive is not utilized, even though the foot driven mechanism is in use. The drive assembly is lightweight and can be readily mounted on a conventional foot pedal drive bicycle.

Briefly, the drive requires a translatable handlebar to linearly move a drive line such as a cable or chain. The drive line is coupled to a ratchet means which selectively engages a drive sprocket wheel which can be mounted on the front or rear bicycle wheel or on the foot pedal crank. Importantly, a free wheeling mechanism couples the ratchet means and the drive sprocket wheel whereby tension in the drive line engages the ratchet means for driving the sprocket wheel while removal of tension in the drive line releases the ratchet means and allows the sprocket wheel to rotate free of the ratchet means.

The invention and objects and features thereof will be more readily apparent from the following detailed description and appended claims when taken with the drawing.

DETAILED DESCRIPTION OF ILLUSTRATIVE EMBODIMENTS

Figure 1:
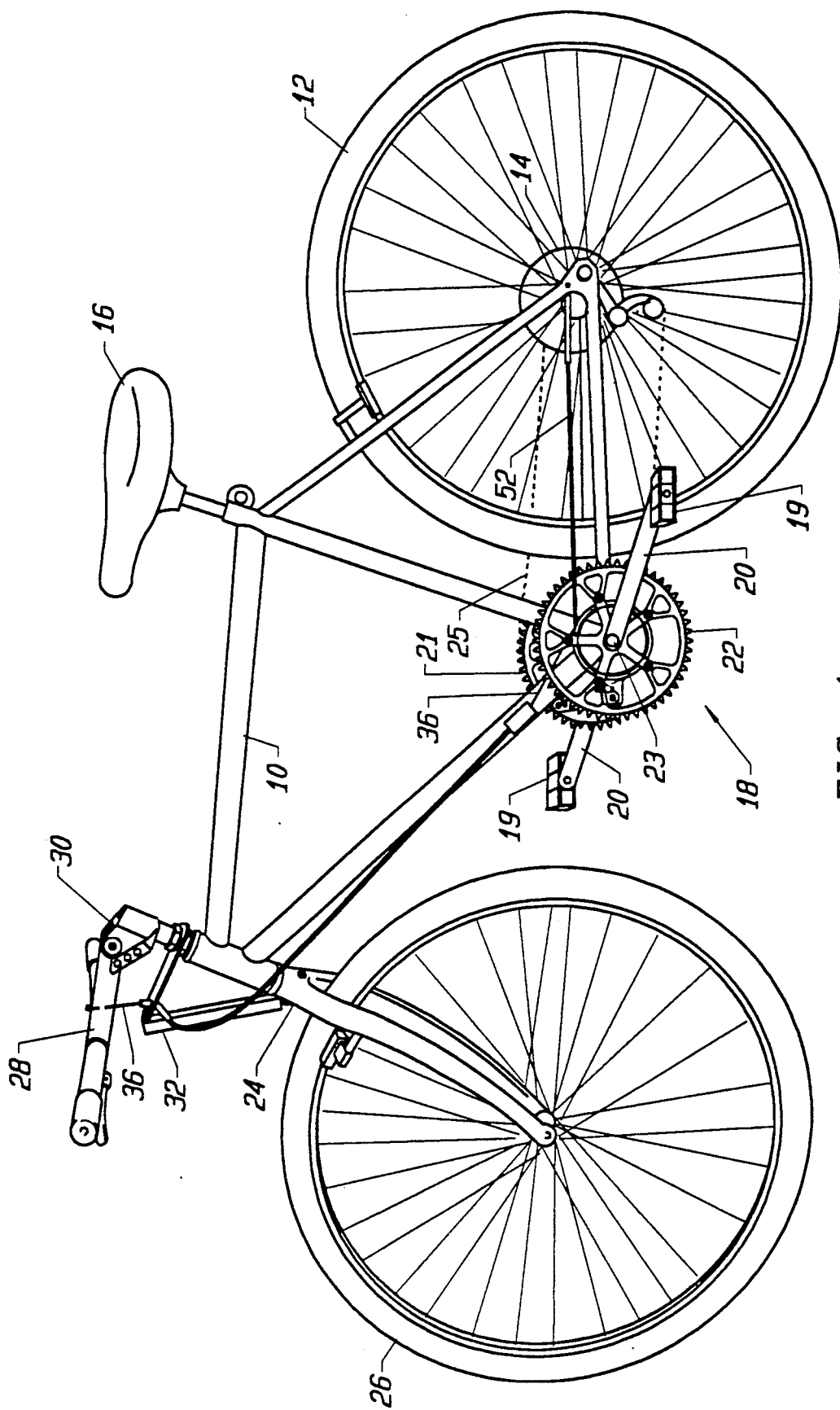
FIG. 1 is a side elevation view of a bicycle in accordance with one embodiment of the invention.

Referring now to the drawings, FIG. 1 is a side elevation view of a dual drive bicycle in accordance with one embodiment of the invention. The bicycle includes a conventional frame 10 to which are mounted a rear wheel 12 and chain drive sprocket 14 and a seat 16. Also mounted to the frame 10 is a crank assembly shown generally at 18 including a first chain sprocket wheel 20 and a second drive sprocket wheel 22. A chain 25 links the first drive sprocket wheel 21 and the chain sprocket wheel 14 on the rear wheel 12. A fork member 24 is rotatably mounted in the frame 10 and supports a front wheel 26. Handlebars 28 are pivotally attached at 30 to the front fork for steering the bicycle and powering the arm assisted drive.

Figure 2:
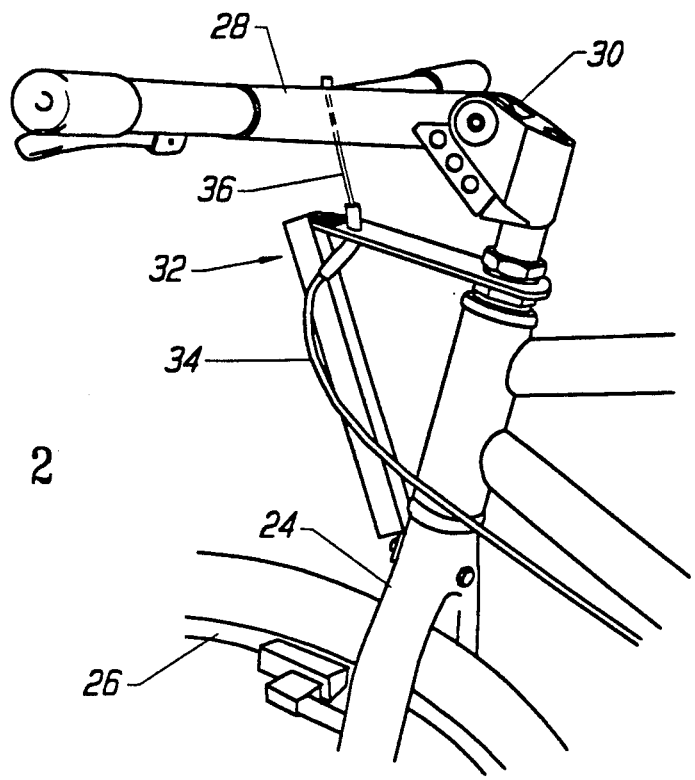
FIGS. 2 and 3 are isometric views of a pivotable handlebar in two positions in accordance with one embodiment.
Figure 3:
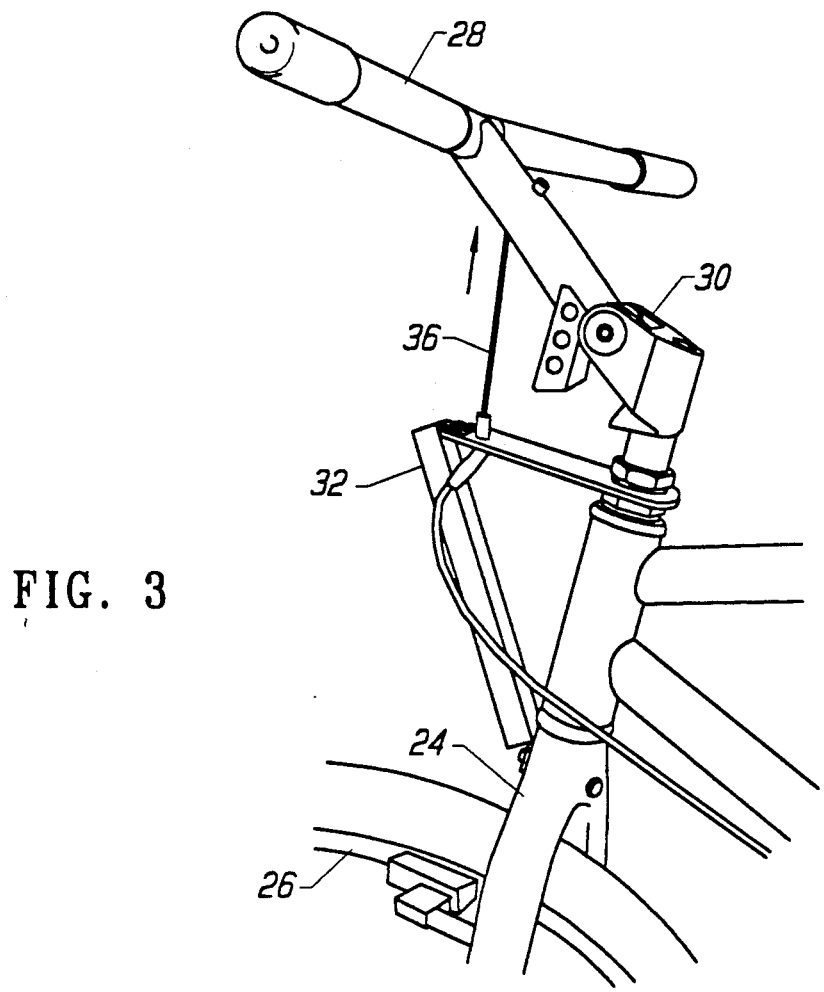

FIG. 2 and FIG. 3 are isometric views of the handlebars 28 in a first position in which the arm assisted drive is not engaged and in a raised position for the arm assisted drive, respectively. A bracket assembly shown generally at 32 supports a sleeve 34 which houses a drive line 36. Alternatively, a cable and pulley or a chain and sprocket can be used as the drive line. The drive line 36 is fastened to the handlebars 28 and is translated as shown in FIG. 3 upon the pivotal raising of the handlebars. The other end of the drive line is connected to ratchet means in the drive assembly as shown in FIG. 4.

Figure 4:
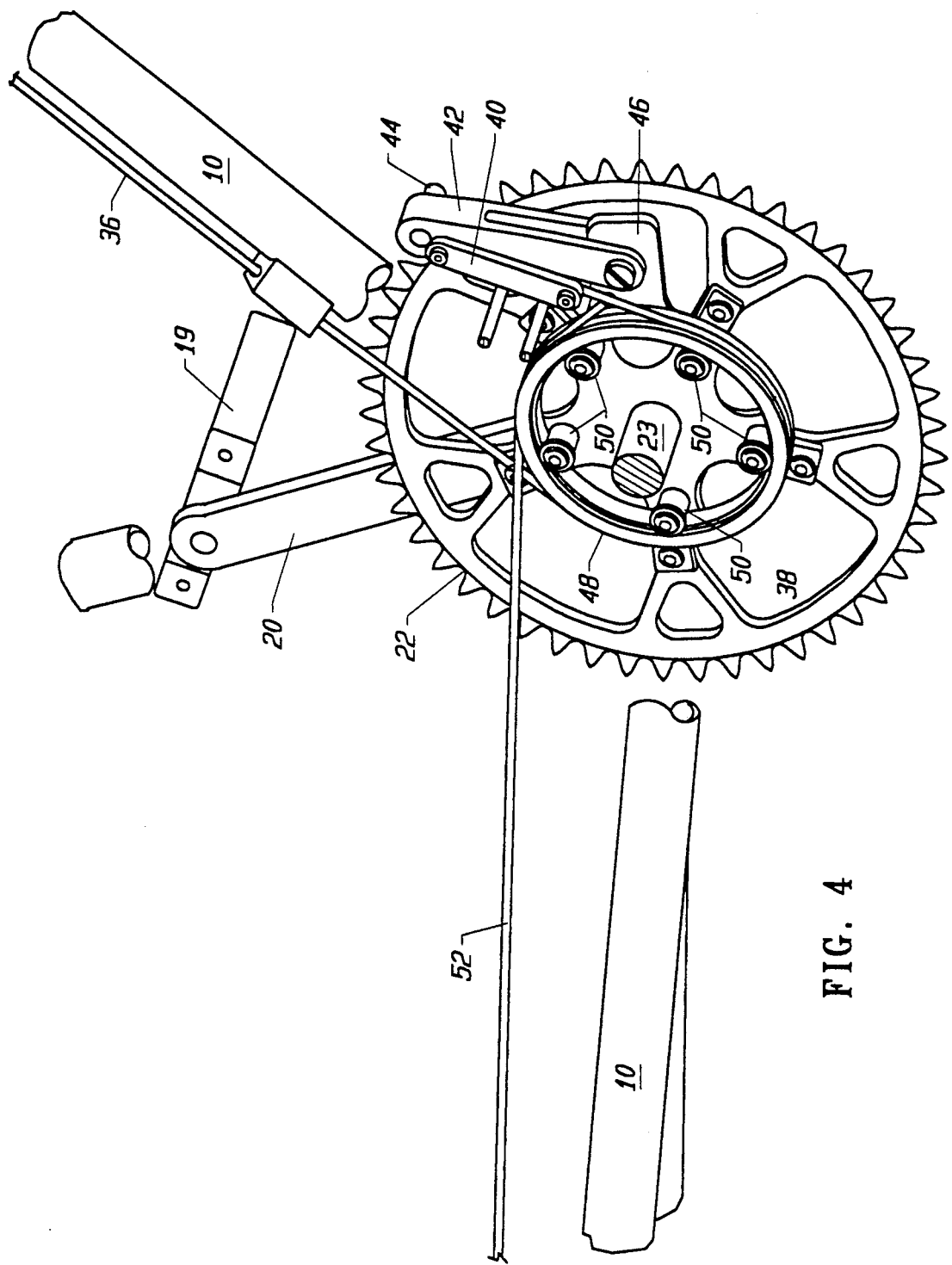
FIG. 4 is an isometric view of a drive assembly in accordance with one embodiment of the invention.
Figure 5:
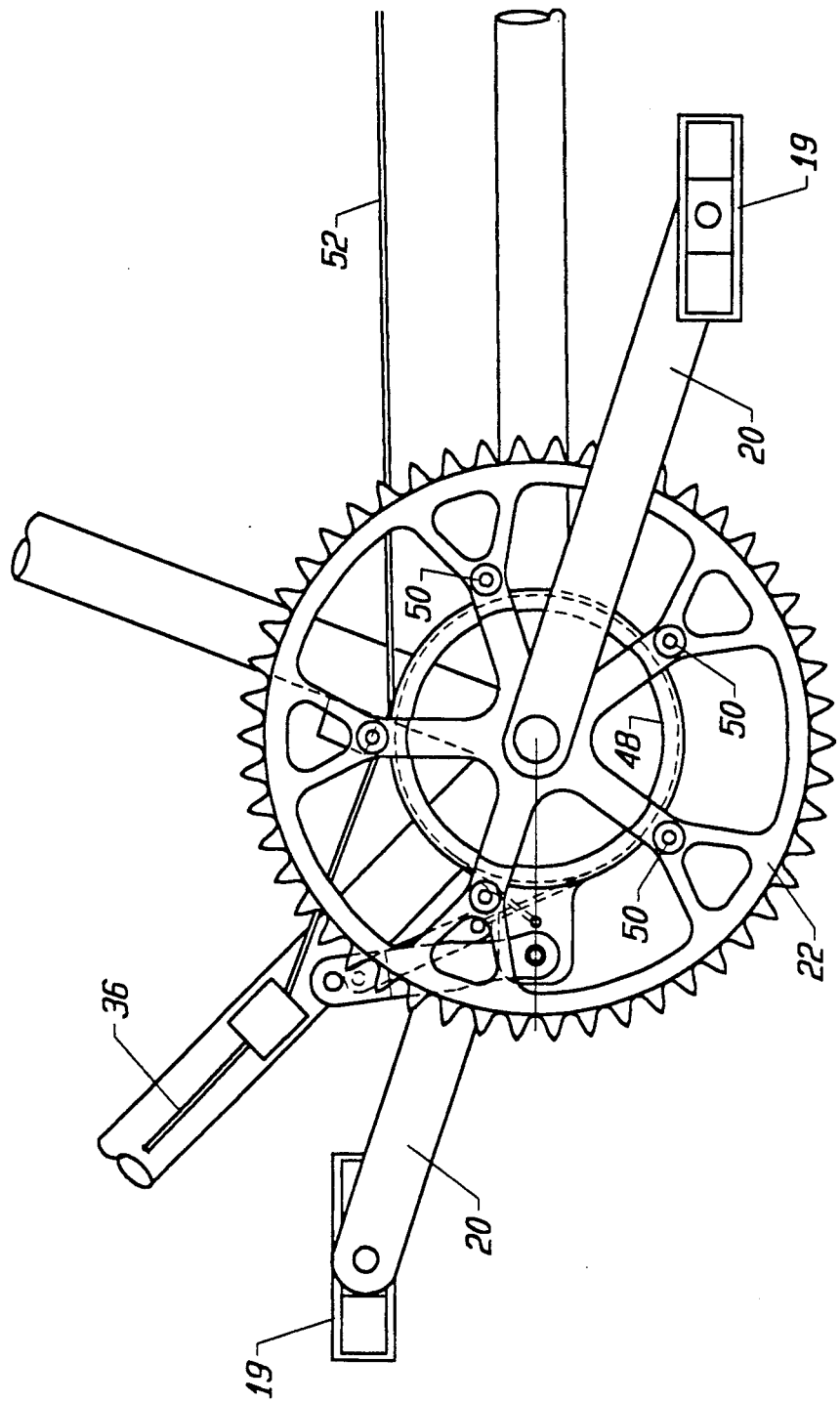
FIG. 5 is an outside side elevation view of the drive assembly of FIG. 4.

FIG. 4 is an isometric view of the drive assembly in accordance with one embodiment of the invention. The drive line 36 from the handlebar is wrapped around a free wheeling support means shown generally at 38 and engages a pull bar 40 of the ratchet means. Pull bar 40 is attached to a pivot link 42 which includes a drive pin 44 that can be pivoted into engagement with the teeth of drive sprocket wheel 22. The pivot link 42 is attached to an ear 46 extending from a hub 48 of the free wheeling support means 38. Hub 48 is rotatably fastened to the drive sprocket wheel 22 by means of bearings 50. An elastic cord 52 has one end fastened to the frame 10 (FIG. 1) and the other end wrapped around hub 48 and engaging ear 46 to yieldably maintain the free wheeling support means in the illustrated position with the drive pin 44 disengaged from the teeth of the drive sprocket wheel 22. In this position, the hub 48 remains stationary even when the drive sprocket wheel 22 is being driven by the foot pedal 19 and crank 20, and drive rod 23 is rotated. FIG. 5 is an outside side elevation view of the drive assembly of FIG. 4.

Figure 6:
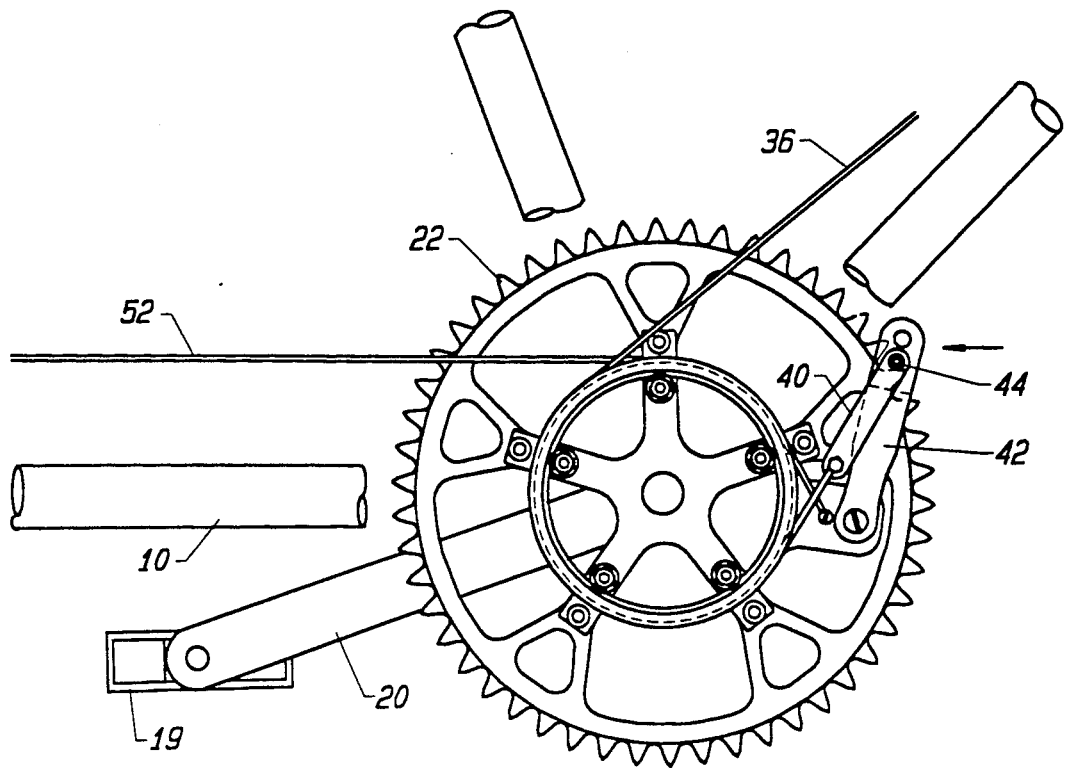
FIG. 6 is an inside side elevation of the drive assembly of FIG. 4 prior to engagement with a drive sprocket wheel.
Figure 7:
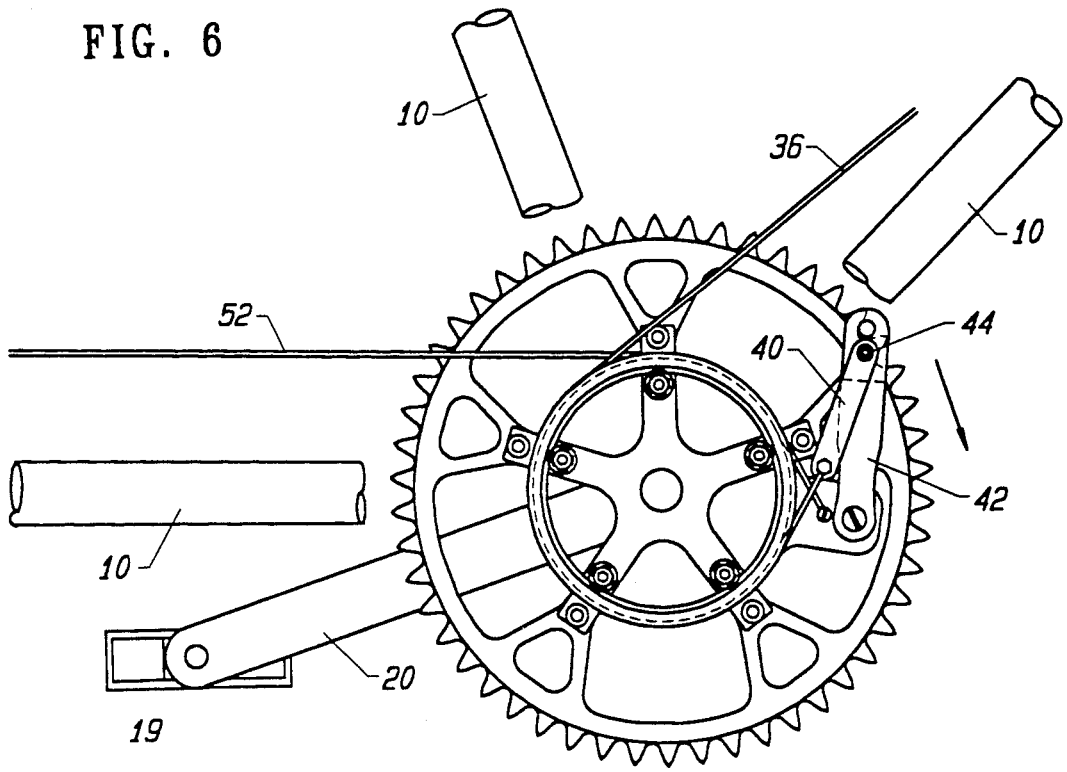
FIG. 7 is a side elevation view of the drive assembly of FIG. 4 upon engagement with the drive sprocket wheel.

Operation of the drive assembly will be described with reference to the inside side elevation views of FIGS. 6-9. In FIG. 6, tension in the drive line 36 due to the pivoting of the handlebars pulls the drive pin 44 into engagement with the teeth of the drive sprocket wheel 22. Further movement of the handlebars and the drive line 36 causes a translation of the drive sprocket wheel 22 through the pull bar 40 as illustrated in FIG. 7.

Figure 8:
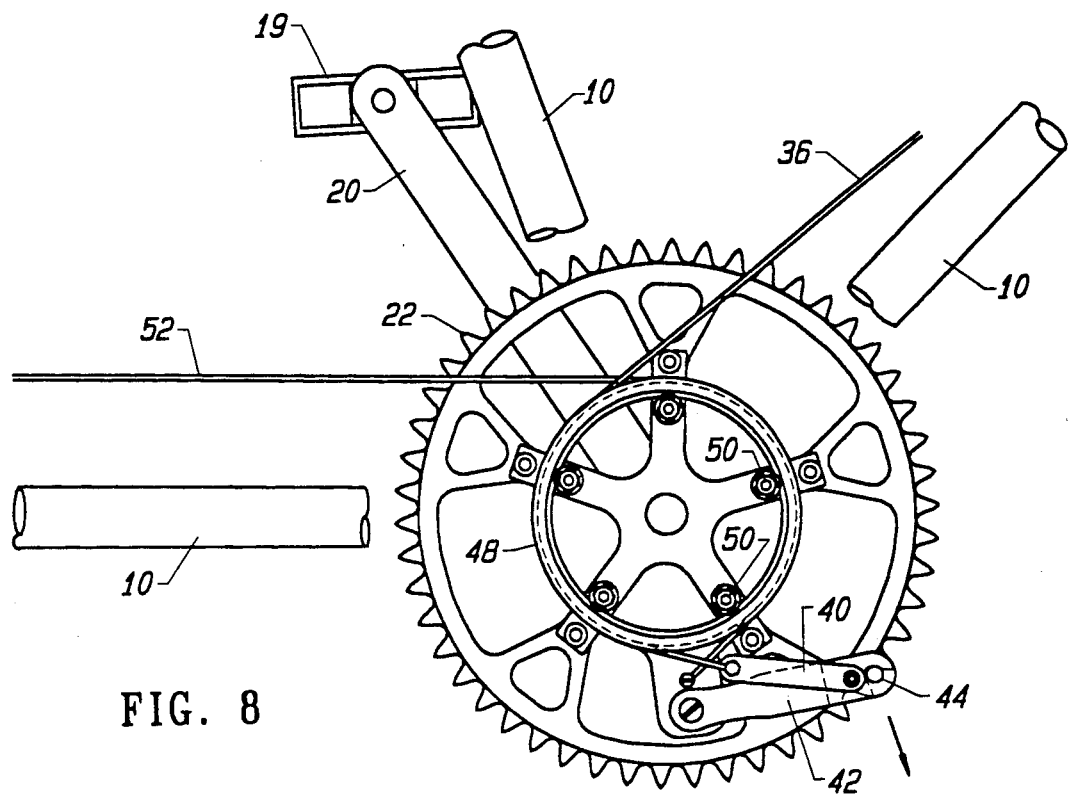
FIG. 8 is a side elevation view of the drive assembly of FIG. 4 upon completion of drive of the sprocket wheel.
Figure 9:
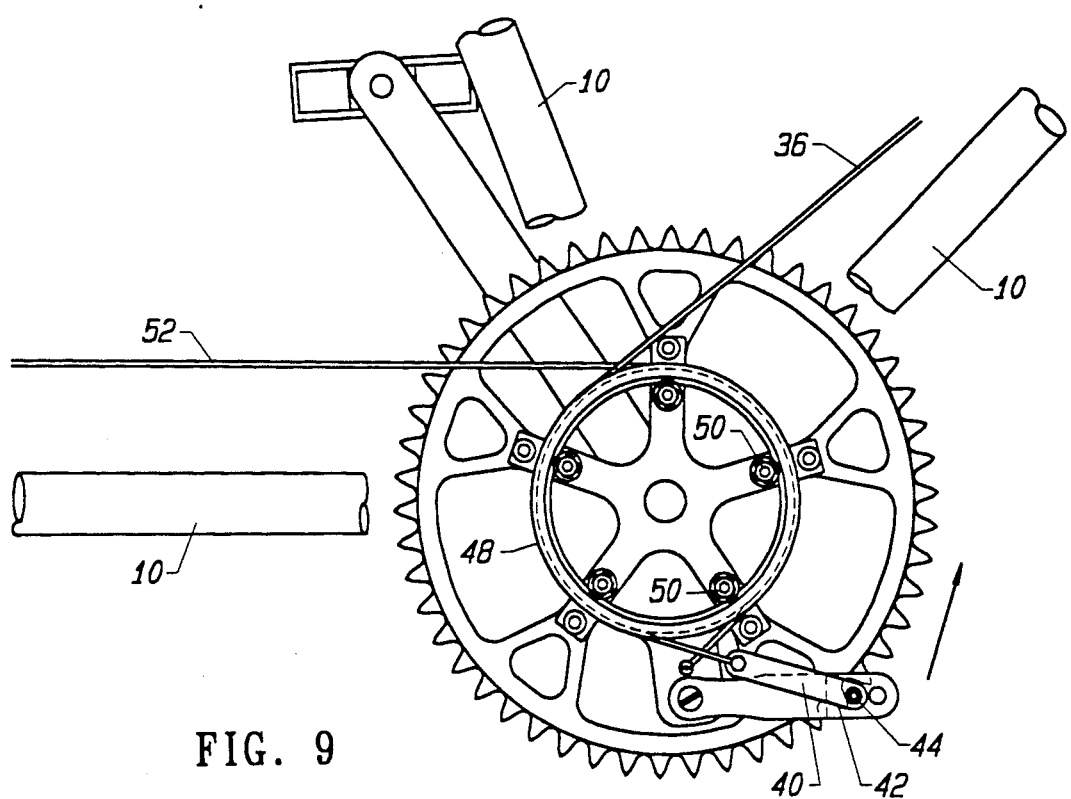
FIG. 9 is a side elevation view of the drive assembly of FIG. 4 upon release of the drive assembly from the drive sprocket wheel.

In FIG. 8, the handlebars have reached the uppermost pivot position, and tension on the drive line 36 is released. This in turn releases the drive pin 44 from the teeth of drive sprocket wheel 22 as shown in FIG. 4, and the elastic cord 52 pulls the hub 48 and pivot link 42 back to the position illustrated in FIG. 4 and FIG. 6. The free wheeling support mechanism 38 allows the ratchet means to remain disengaged from the drive sprocket wheel 22 until the handlebars are again pivoted upward thereby pulling the drive pin 44 into engagement with the sprocket wheel teeth through the drive line 36.

Figure 10:
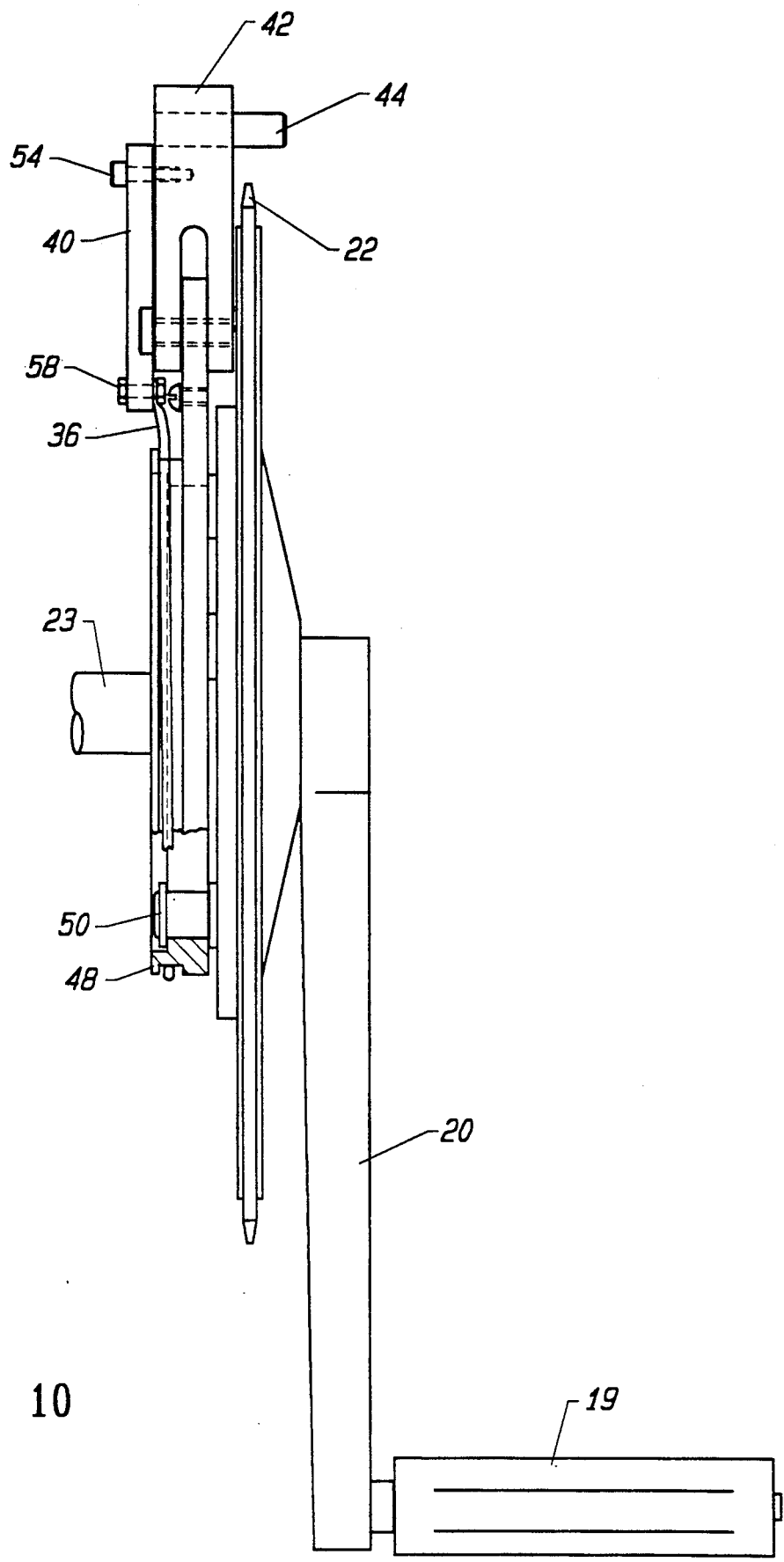
FIG. 10 is a front elevation view of the drive assembly, drive sprocket wheel, and a portion of the foot crank assembly.

FIG. 10 is a front elevation view of the drive assembly of FIG. 4 and further illustrates the arrangement of the drive sprocket wheel 22 on the drive rod 23 and the attachment of the hub 48 on the drive sprocket wheel 22 by means of bearings 50. Drive pin 44 mounted on the pivot link 42 is shown disengaged from the sprocket teeth. One end of the pull bar 40 is attached to the pivot link 42 by means of a pin 54 and the other end of the pull bar 40 is attached to the drive line 36 by fastener 58.

Figure 11:
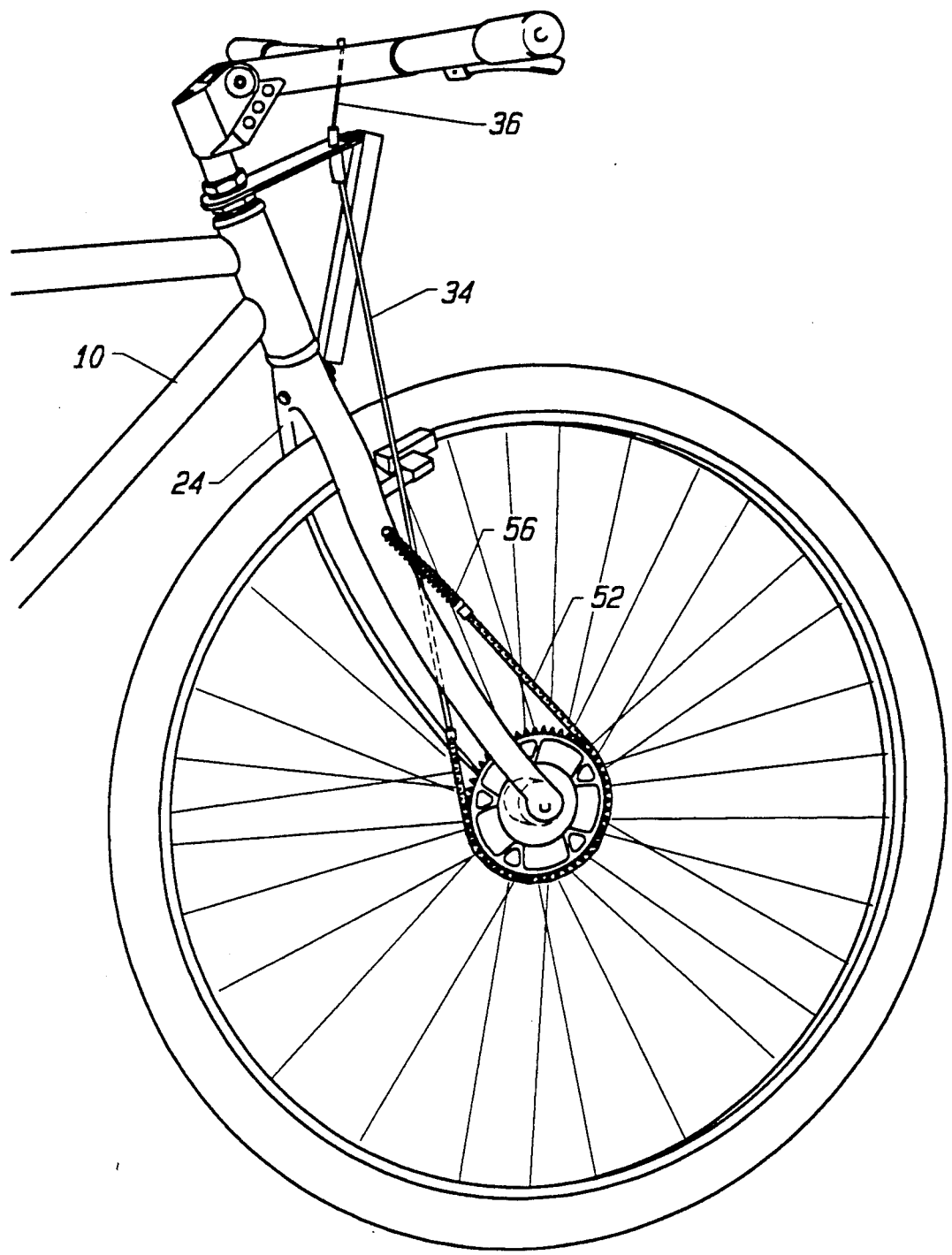
FIG. 11 is a side elevation view of the drive assembly mounted on the front wheel of a bicycle in accordance with another embodiment of the invention.

FIG. 11 is a side elevation view of a portion of a bicycle with the arm assisted drive mounted to the front wheel of the bicycle in accordance with another embodiment of the invention. This embodiment allows the sleeve 34 and drive line 36 to go directly to the drive assembly. The elastic cord 52 is fastened to the fork of the bicycle either directly or by means of a spring 56.

There has been described a dual drive bicycle including an arm assisted drive which is readily accommodated on a conventional bicycle. The drive assembly can be mounted directly to the foot crank mechanism or on either wheel of the bicycle. The drive assembly is lightweight and can be accommodated with a pivotally mounted or linearly mounted handlebar without adversely affecting the steering of the bicycle.

While the invention has been described with reference to specific embodiments, the description is illustrative of the invention and is not to be construed as limiting the invention. For example, an alterative embodiment can use a second sprocket wheel or pair of wheels in place of the second sprocket wheel. The second sprocket wheel is attached to a free wheel device on the common shaft with the first sprocket wheel that drives the rear wheel via a chain. Driving force is applied to the drive line which pulls on engagement pin or teeth attached to the drive line into contact with the second sprocket wheel or wheels. The drive line thus engages the geared sprocket wheel, applied torque, and then returns to the disengagement position, along with the free wheel by a spring attached to the drive line. Further, rather than a single pivoting handlebar as shown, the handlebar mechanism may consist of a stationary handle used for steering only, which does not pivot itself, but contains a concentric tube which pivots by means of forward-extending "bar ends" which are pulled to exert force on a cable attached to the ratchet mechanism to provide motive power. The advantage is that the fixed outer stationary handle can be used to mount the bicycle brakes and shifter mechanisms, which remain fixed when applying force through the motion of the inner concentric tubing and "bar ends."

Thus, various modifications and applications may occur to those skilled in the art without departing from the true spirit and scope of the invention as defined by the appended claims.

What is claimed is:

1. A dual drive bicycle comprising
a support frame,
a fork member rotatably supported in said support frame,
a front wheel mounted to said fork member,
a rear wheel including a chain sprocket wheel,
a crank mechanism including foot pedals rotatably mounted on said support frame and including a first drive sprocket wheel and a second drive sprocket wheel,
a chain linking said chain sprocket wheel of said rear wheel and said first drive sprocket wheel,
a drive mechanism for said second drive sprocket wheel including a ratchet means for pivotal engagement with said second drive sprocket wheel, a free wheel in mechanism including a hub, said ratchet means including a pivot link having one end attached to said hub and an opposite end engaging said second drive sprocket wheel when said hub is driven in one direction, and a drive line coupled to said ratchet means for driving said ratchet means and said second drive sprocket wheel,
a handlebar movably attached to said fork member, said handlebar being pivotally attached to said fork member with a pivotal axis of said handlebar being parallel to a rotation axis of said front wheel, and
means attaching said drive line to said handlebar whereby movement of said handlebar linearly moves said drive line and drives said drive mechanism.

2. The dual drive bicycle as defined by claim 1 wherein said first drive sprocket wheel is positioned on one side of said support frame and said second drive sprocket wheel is positioned on another side of said frame.

3. The dual drive bicycle as defined by claim 1 wherein said drive line comprises a cable.

4. The dual drive bicycle as defined by claim 1 wherein said drive mechanism further includes a pull bar having one end attached to said pivot link and another end fastened to said drive line.

5. The dual drive bicycle as defined by claim 4 wherein said drive mechanism further includes resilient means for yieldably maintaining said ratchet means in a first position disengaged from said second drive sprocket wheel.

6. An arm powered drive assembly for a bicycle having a support frame attached to a rear wheel, a fork member rotatably mounted to said support frame and attached to a front wheel, a foot crank mechanism including a drive shaft for driving said rear wheel, said arm powered drive assembly comprising a drive sprocket wheel coupled to said crank mechanism, a ratchet means for pivotal engagement with said drive sprocket wheel, a drive line coupled to said ratchet means for driving said ratchet means and said drive sprocket wheel, a free wheeling mechanism for coupling said ratchet means and said drive sprocket wheel, said free wheeling mechanism including a hub and bearing means attaching said hub to said crank mechanism, said ratchet means including a pivot link having one end attached to said hub and an opposite end engaging said drive sprocket wheel when said hub is driven in one direction, a handlebar movably attached to said fork member, said handlebar being pivotally attached to said fork member with a pivotal axis of said handlebar being parallel to a rotation axis of said front wheel, and means attaching said drive line to said handlebar whereby movement of said handlebar linearly moves said drive line and drives said ratchet means and drive sprocket wheel.

7. The arm powered drive assembly as defined by claim 6 wherein said ratchet means further includes a pull bar having one end attached to said pivot link and another end fastened to said drive link.

8. The arm powered drive assembly as defined by claim 7 wherein said ratchet means further includes resilient means for yieldably maintaining said ratchet means in a first position disengaged from said drive sprocket wheel.

9. The arm powered drive assembly as defined in claim 8 wherein said drive line comprises a cable.

* * * * *